US009049079B2

(12) United States Patent
Sasatani

(10) Patent No.: US 9,049,079 B2
(45) Date of Patent: Jun. 2, 2015

(54) OPTIMIZING SOFTWARE CONFIGURATION VALUES USING CMDB

(71) Applicant: International Business Machines Corporation, Armonk, NY (US)

(72) Inventor: Yohkichi Sasatani, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 13/709,343

(22) Filed: Dec. 10, 2012

(65) Prior Publication Data
US 2013/0166702 A1 Jun. 27, 2013

(30) Foreign Application Priority Data
Dec. 21, 2011 (JP) ................. 2011-279558

(51) Int. Cl.
G06F 15/16 (2006.01)
H04L 29/08 (2006.01)
G06F 9/44 (2006.01)
G06F 9/445 (2006.01)
G06Q 10/04 (2012.01)

(52) U.S. Cl.
CPC ............ *H04L 29/08981* (2013.01); *G06F 8/00* (2013.01); *G06F 9/44505* (2013.01); *G06Q 10/04* (2013.01)

(58) Field of Classification Search
CPC ............ H04L 41/0803; H04L 41/0813; H04L 41/085; G06Q 10/04
USPC ................................................. 709/220, 221
See application file for complete search history.

(56) References Cited

U.S. PATENT DOCUMENTS

| 8,069,231 | B2* | 11/2011 | Schran et al. | 709/221 |
| 2008/0065931 | A1* | 3/2008 | Coulter et al. | 714/37 |
| 2008/0307263 | A1* | 12/2008 | Coulter et al. | 714/37 |
| 2011/0066708 | A1* | 3/2011 | Schran et al. | 709/221 |
| 2012/0022700 | A1* | 1/2012 | Drees et al. | 700/276 |
| 2012/0066161 | A1* | 3/2012 | Miller | 706/12 |
| 2013/0185039 | A1* | 7/2013 | Tesauro et al. | 703/6 |
| 2013/0185236 | A1* | 7/2013 | Tonouchi | 706/20 |
| 2013/0191107 | A1* | 7/2013 | Tonouchi | 703/21 |

FOREIGN PATENT DOCUMENTS

| JP | 2000089987 A | 3/2000 |
| JP | 2002342182 A | 11/2002 |

(Continued)

*Primary Examiner* — Lynn Feild
*Assistant Examiner* — Jonathan Bui
(74) *Attorney, Agent, or Firm* — Yee & Associates, P.C.; Jeffrey S. LaBaw

(57) ABSTRACT

A method, device, system, and program able to automatically optimize configuration values in software constituting an integrated system. The integrated system introduction support device collects from a configuration management database (CMDB) software configuration values related to other integrated systems sharing interactive aspects with the software constituting the target integrated system, and generates a regression model of configuration values having a high correlation among the collected software configuration values. When configuration values in a predetermined software program constituting the integrated system have been specified by the user, the integrated system introduction support device applies the specified configuration values to the regression model, and calculates an optimum value for the other software programs constituting the integrated system.

16 Claims, 17 Drawing Sheets

(56) References Cited

FOREIGN PATENT DOCUMENTS

| | | |
|---|---|---|
| JP | 2003263342 A | 9/2003 |
| JP | 2004086782 A | 3/2004 |
| JP | 2005113910 A | 4/2005 |
| JP | 2005513932 A | 5/2005 |
| JP | 2006277403 A | 10/2006 |
| JP | 2007304796 A | 11/2007 |
| JP | 2011154540 A | 8/2011 |

* cited by examiner

|  | System B | System C | System D | System E |
| --- | --- | --- | --- | --- |
| Timeout | 300 | 300 | 300 | 300 |
| KeepAlive | 1 | 1 | 1 | 1 |
| KeepAliveTimeout | 15 | 15 | 15 | 15 |
| MaxClients | 150 | 500 | 300 | 50 |
| KeepAlive | 100 | 100 | 100 | 100 |
| ConnectionTimeout | 360 | 360 | 360 | 360 |
| MaxConnections | 200 | 550 | 350 | 70 |
| MinConnections | 50 | 50 | 50 | 50 |
| MaxAppls | 250 | 600 | 360 | 80 |
| MaxAgents | 250 | 600 | 360 | 80 |
| AgentStackSize | 2048 | 2048 | 2048 | 2048 |
| ApplHeapSize | 512 | 512 | 512 | 512 |
| JavaHeapSize | 2048 | 2048 | 2048 | 2048 |
| QueryHeapSize | 2048 | 2048 | 2048 | 2048 |
| ⋮ | ⋮ | ⋮ | ⋮ | ⋮ |

OPTIMIZING SOFTWARE CONFIGURATION VALUES USING CMDB

TECHNICAL FIELD

The present invention relates to a technique for introducing an integrated system in a distributed network environment, and more specifically to a technique for optimizing software configuration values in an integrated system.

BACKGROUND ART

Integrated systems are known in which a plurality of software programs interact via a network to provide a service (see, for example, Patent Literature 1). In an integrated system in which many software programs interact in complex ways, the configuration values of the software programs constituting the system have to be aligned with the characteristics of the system and optimized in order to improve the security, performance, and reliability of the system as a whole.

However, optimization of software configuration values requires system managers to perform manual operations relying on large amounts of information provided by software manufacturers and based on their own experience. These operations are time-consuming and labor-intensive. This trend is particularly noticeable in multi-vendor environments, because hardly any basic information is provided for getting software from different manufacturers to interact.

CITATION LIST

Patent Literature

Patent Literature 1 Laid-open Patent Publication No. 2005-96232

SUMMARY OF INVENTION

Technical Problems

The purpose of the present invention is to solve this technical problem by providing a novel method, device, system, and program able to automatically optimize configuration values in software constituting an integrated system.

Solution to Problems

The present inventor conducted extensive research on novel methods able to automatically optimize configuration values in software constituting an integrated system. As a result, the present inventor conceived a configuration in which software configuration values related to other integrated systems sharing interactive aspects with the software are collected using a configuration management database (CMDB), and the software configuration values are optimized using a regression model generated from the collected software configuration values. The present invention is a product of this concept.

In other words, the present invention provides a method for optimizing configuration values in a plurality of software programs in an integrated system, the software programs in the integrated system interacting with each other via a network, in which the method includes the steps of: collecting, from a CMDB in the network, configuration values in the plurality of software programs constituting the integrated system and configuration values of software programs constituting any other integrated system sharing interactive aspects with it; generating a regression model of configuration values having a high correlation among the collected configuration values; and calculating the optimum value for the configuration values in the software using the regression model. A computer-readable program is also provided enabling a computer to execute the steps in this method.

In addition, the present invention provides a device for optimizing configuration values in a plurality of software programs in an integrated system, the software programs in the integrated system interacting with each other via a network, in which the device includes: a CMDB search unit for collecting, from a CMDB in the network, configuration values in the plurality of software programs constituting the integrated system and configuration values of software programs constituting any other integrated system sharing interactive aspects with it; a regression model generating unit for generating a regression model of configuration values having a high correlation among the collected configuration values; and an optimum value calculating unit for calculating the optimum value for the configuration values in the software using the regression model.

Furthermore, the present invention provides a system for optimizing configuration values in a plurality of software programs in an integrated system, the software programs in the integrated system interacting with each other via a network, in which the system includes: means for collecting, from a CMDB in the network, configuration values in the plurality of software programs constituting the integrated system and configuration values of software programs constituting any other integrated system sharing interactive aspects with it; means for generating a regression model of configuration values having a high correlation among the collected configuration values; means for calculating an optimum value for the software configuration values using the regression model; and means for setting the calculated optimum value in another software program installed in a computer device in the network.

Effect of Invention

As mentioned above, the present invention provides a novel method, device, system, and program able to automatically optimize configuration values in software constituting an integrated system.

BRIEF DESCRIPTION OF DRAWINGS

FIG. 10 is a diagram showing a consolidated table.

FIG. 11 is a diagram showing analysis results from the statistical analysis module.

DESCRIPTION OF EMBODIMENT

Figure 1:
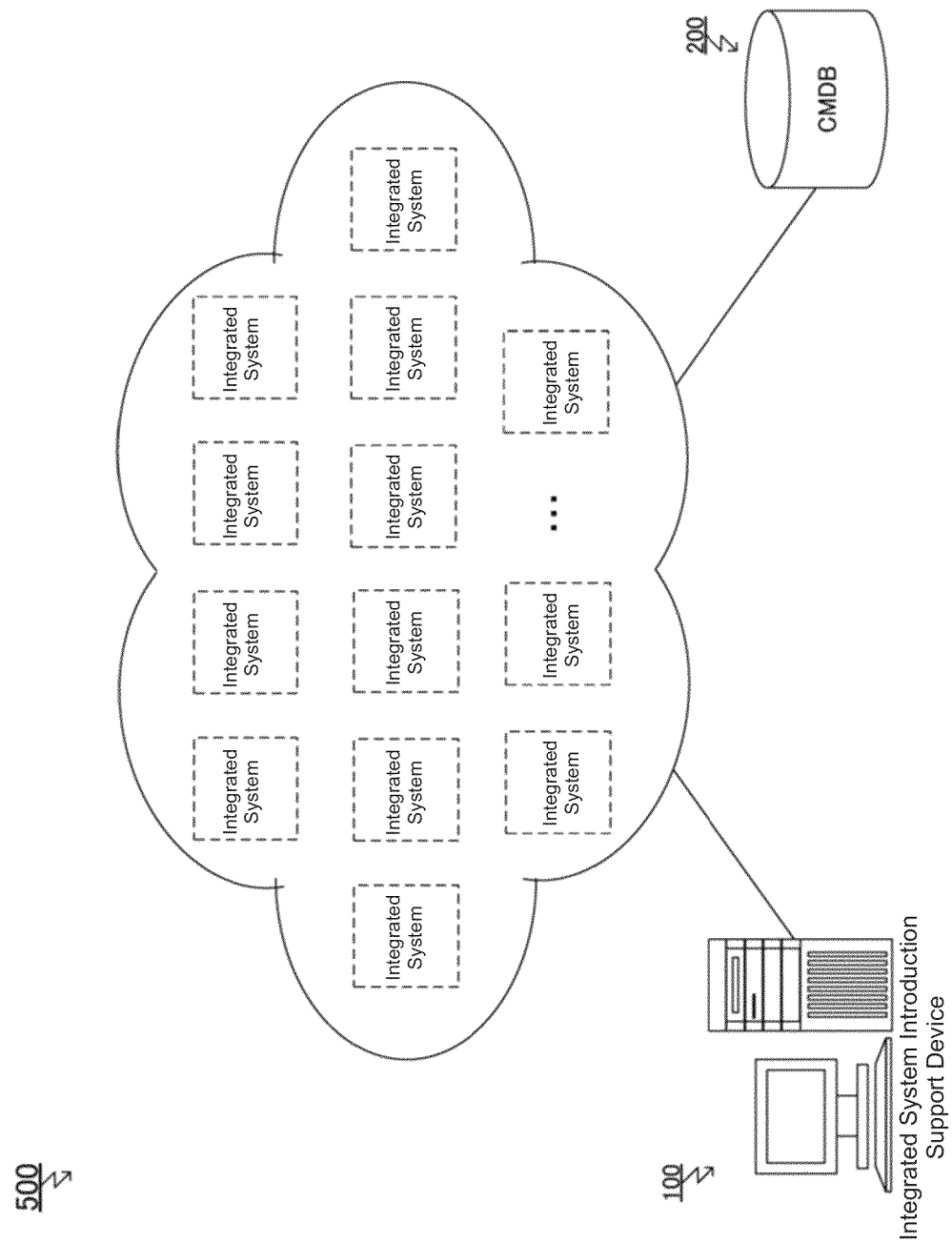
FIG. 1 is a conceptual diagram showing the integrated system introduction support device in the embodiment installed in a distributed network environment.

The present invention will be explained below with reference to an embodiment shown in the drawings, but the present invention is not limited in any way by the embodiment shown in the drawings. In the drawings referenced below, common elements are denoted using the same reference signs, and further explanation of these elements is eliminated where appropriate.

FIG. 1 is a conceptual diagram showing the integrated system introduction support device 100 in the embodiment of the present invention installed in a distributed network environment 500. In the distributed network environment 500 shown in FIG. 1, many computer devices communicate and interact with each other via a network such as the Internet. As a result, many integrated systems have been built and are running The integrated system introduction support device 100 in the present embodiment supports the introduction of new integrated systems to the distributed network environment 500, and has functions for remotely installing the necessary software on computer devices in the distributed network environment 500, and for remotely setting and changing the configuration values in the software.

In the present embodiment, a configuration management database (CMDB) 200 has been installed in the distributed network environment 500. Because the functioning of the integrated system introduction support device 100 in the present embodiment is premised on the presence of a configuration management database, a configuration management database will be briefly explained before explaining the integrated system introduction support device 100 in detail.

A configuration management database (CMDB) is an essential component for complying with the guidelines of IT service management as defined by the IT Infrastructure Library® (ITIL), and is a database for centralized management of information related to IT service management.

In the data model for a configuration management database (CMDB), the items managed in a distributed network environment are defined as configuration items (CI). For example, items defined as configuration items (CI) include computer devices such as servers and client terminals, hardware such as network devices and storage devices, software such as operating systems (OS), middleware, package software, and management tools installed in computer devices.

The CMDB manages defined CIs along with their attributes. In the management of CI, attributes are concepts used to identify and describe individual CI. In the CMDB data model, the generic name (for example, server, client, firewall), the product name, the serial number, the manufacturer, etc. are defined as attributes.

Also, the CMDB manages information on the relationship between CIs in order to achieve a high level of configuration management, such as impact analysis. In this regard, the relationship between individual CIs is defined in the CMDB data model. Examples of relationships include assigns, canConnect, canUse, connectAt, connects, controls, deployedOn, Located, Managed, Owned, provides, runAt, uses, and usedBy.

The management software for CMDB periodically retrieves OS setting files and configuration information, for example, using SSH (secure shell) and so on, and executes setting verification commands to automatically discover CI attributes scattered throughout the distributed network environment and their relationship to other CIs (discovery) and to update the CMDB (tracking) This ends the brief explanation of a CMDB.

The present embodiment is premised on software configuration values being defined as software (CI) attributes in a CMDB 200 accessible to the integrated system introduction support device 100, and on the management of software (CI) along with software configuration values (attributes) and information on the relationship between CIs. Here, software configuration values are setting values (parameters) provided from an outside source to specify the functions and actions of software.

Figure 2:
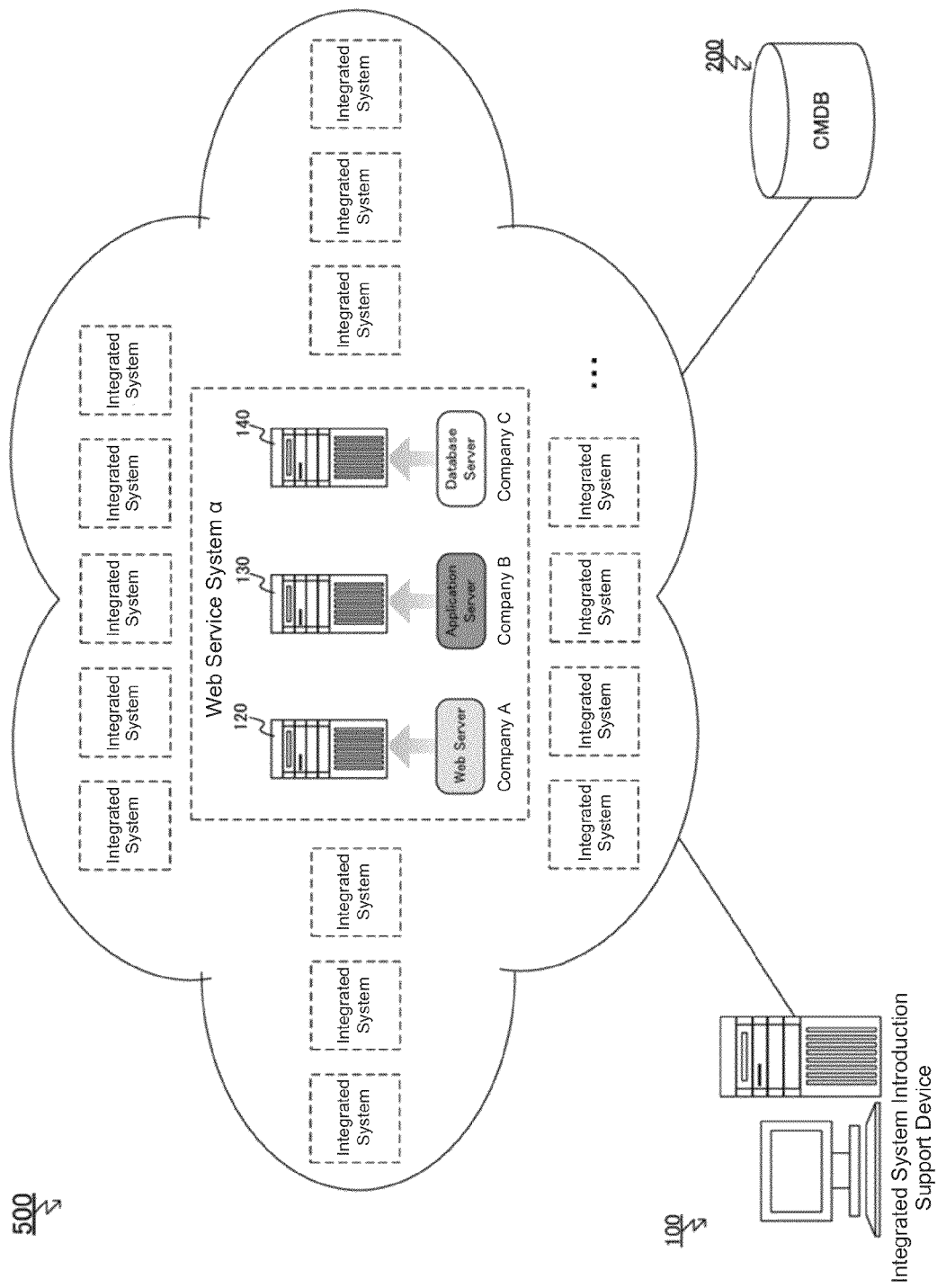
FIG. 2 is a conceptual diagram showing the integrated system introduction support device in the embodiment installed in a distributed network environment.

Now that the premises of the present embodiment have been made clear, the explanation will move on to the integrated system introduction support device 100 in the present embodiment. For the sake of convenience, the integrated system introduction support device 100 will be explained on the basis of a single detailed scenario shown in FIG. 2. FIG. 2 shows a scenario in which the integrated system introduction support device 100 installs web server software (product name: Web Server, manufacturer: Company A) in computer device 120, installs application server middleware (product name: Application Server, manufacturer: Company B) in computer device 130, and installs DBMS (product name Database Server, manufacturer: Company C) in computer device 140 in order to construct Web Service System α.

The system manager has not optimized the configuration values of the software (Web Server, Application Server, Database Server) constituting Web Service System α. However, when the software has different manufacturers, as in FIG. 2, the optimization process is extremely difficult. Here, the integrated system introduction support device 100 achieves automatic optimization of software configuration values by using the following configuration.

Figure 3:
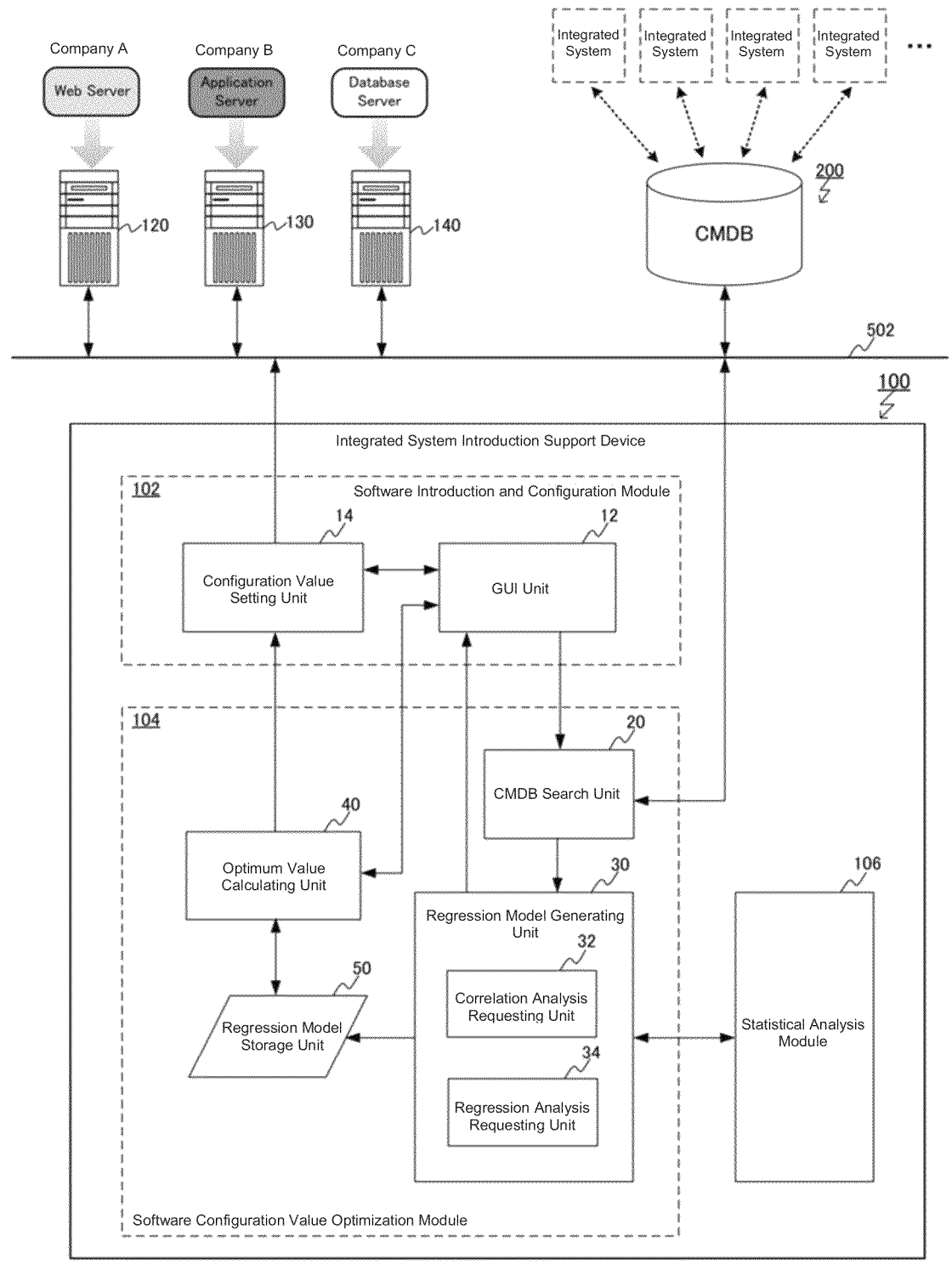
FIG. 3 is a function block diagram of the integrated system introduction support device in the embodiment.

FIG. 3 is a function block diagram of the integrated system introduction support device 100 in the embodiment. As shown in FIG. 3, the integrated system introduction support device 100 includes a software introduction and configuration module 102, a software configuration value optimization module 104, and a statistical analysis module 106.

The software introduction and configuration module 102 is a function module which remotely installs the software needed to construct an integrated system on other computer devices connected to a network 502 such as the Internet to set and change software configuration values, and includes a GUI unit 12 for providing an operation screen for the user and for displaying the execution results, and a configuration value setting unit 14 for remotely changing software configuration values after installation.

The software configuration value optimization module 104 is a function module for realizing automatic optimization of software configuration values, and includes a CMDB search unit 20, a regression model generating unit 30, and an optimization value calculating unit 40. The CMDB search unit 20 is a function unit for communicating with the CMDB 200 via the network 502 to retrieve information related to software (CI) stored in the CMDB 200. The acquired search results are passed on to the regression model generating unit 30.

The regression model generating unit 30 is a function unit for generating a regression model used to calculate the optimum value for software configuration values, and includes a correlation analysis requesting unit 32 for requesting a cross analysis from the statistical analysis module 106, and a regression analysis requesting unit 34 for requesting a regression analysis from the statistical analysis module 106. The optimum value calculating unit 40 is a function unit for calculating the optimum value for software configuration values on the basis of input conditions, and uses a regression model generated by the regression model generating unit 30 to calculate the optimum value for software configuration values.

A brief explanation of the function units constituting the integrated system introduction support device 100 in the present embodiment was provided above. A detailed explanation of the function units will now be explained in greater detail with reference to the flow of processes executed by the integrated system introduction support device 100.

Figure 4:
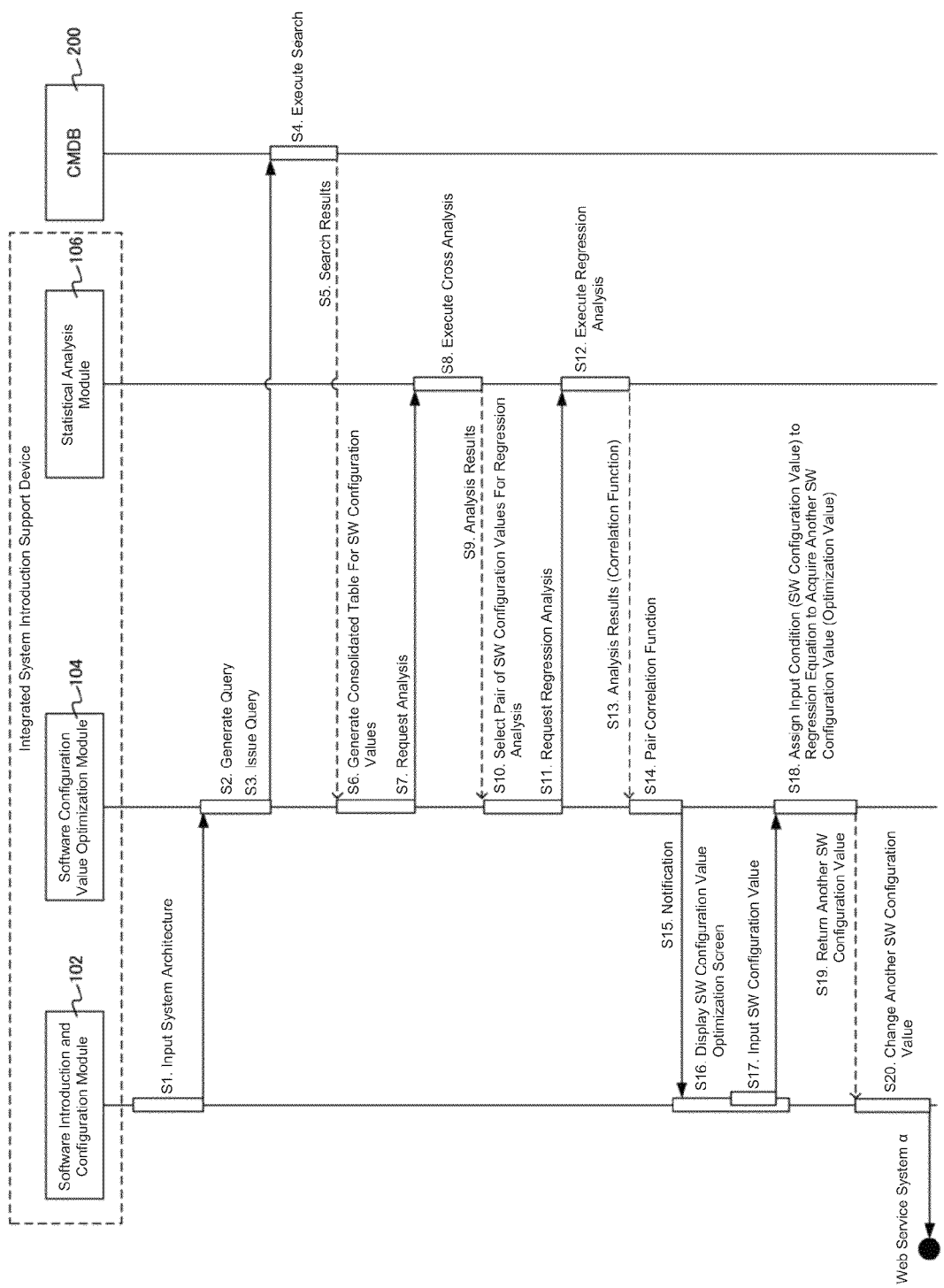
FIG. 4 is a sequence diagram representing the automatic optimization process executed by the integrated system introduction support device in the embodiment.

FIG. 4 is a sequence diagram representing the automatic optimization process executed by the integrated system introduction support device 100 in the present embodiment. In the following explanation, this drawing will be referenced in addition to FIG. 3.

The integrated system introduction support device 100 in the present embodiment is characterized by a search of the CMDB 200 for a plurality software programs to be optimized and other integrated systems sharing interactive aspects with these software programs, and by the use of information related to these other integrated systems when software configuration values are to be automatically optimized. In this regard, the integrated system integration support device 100 receives information describing the interactive aspects of the plurality of software programs to be optimized in Web Service System α(referred to below as system architecture information) from the user as search conditions.

Figure 5:
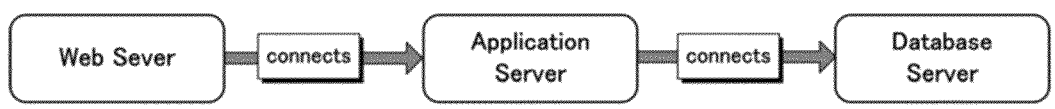
FIG. 5 is a diagram conceptually illustrating system architecture information in the embodiment.

The system architecture information in the present embodiment is described using attributes of the software (CI) defined by the data model for the CMDB 200 and the relationships between these CIs in order to search the CMDB 200. FIG. 5 is a diagram conceptually illustrating system architecture information describing Web Service System α. The system architecture information shown in FIG. 5 describes each software (CI) attribute (product names: Web Server, Application Server, Database Server), and describes the "connects" relationship between software (CI). Here, "connects" represents a local connection between elements (resources).

The GUI unit 12 of the software instruction/configuration module 102 provides the appropriate GUI, and receives the input of the system architecture information described above (S1). The GUI unit 12 transfers the inputted system architecture information to the software configuration value optimization module 104.

The CMDB search unit 20 in the software configuration value optimization module 104 generates a query to search the plurality of software programs and other integrated systems sharing interactive aspects with these software programs on the basis of the system architecture information transferred from the GUI 12 (S2), and issues the generated query to the CMDB 200 (S3). The CMDB 200 executes a search based on the query issued by the software configuration value optimization module 104, and detects the integrated systems matching the query (S4).

Figure 6:
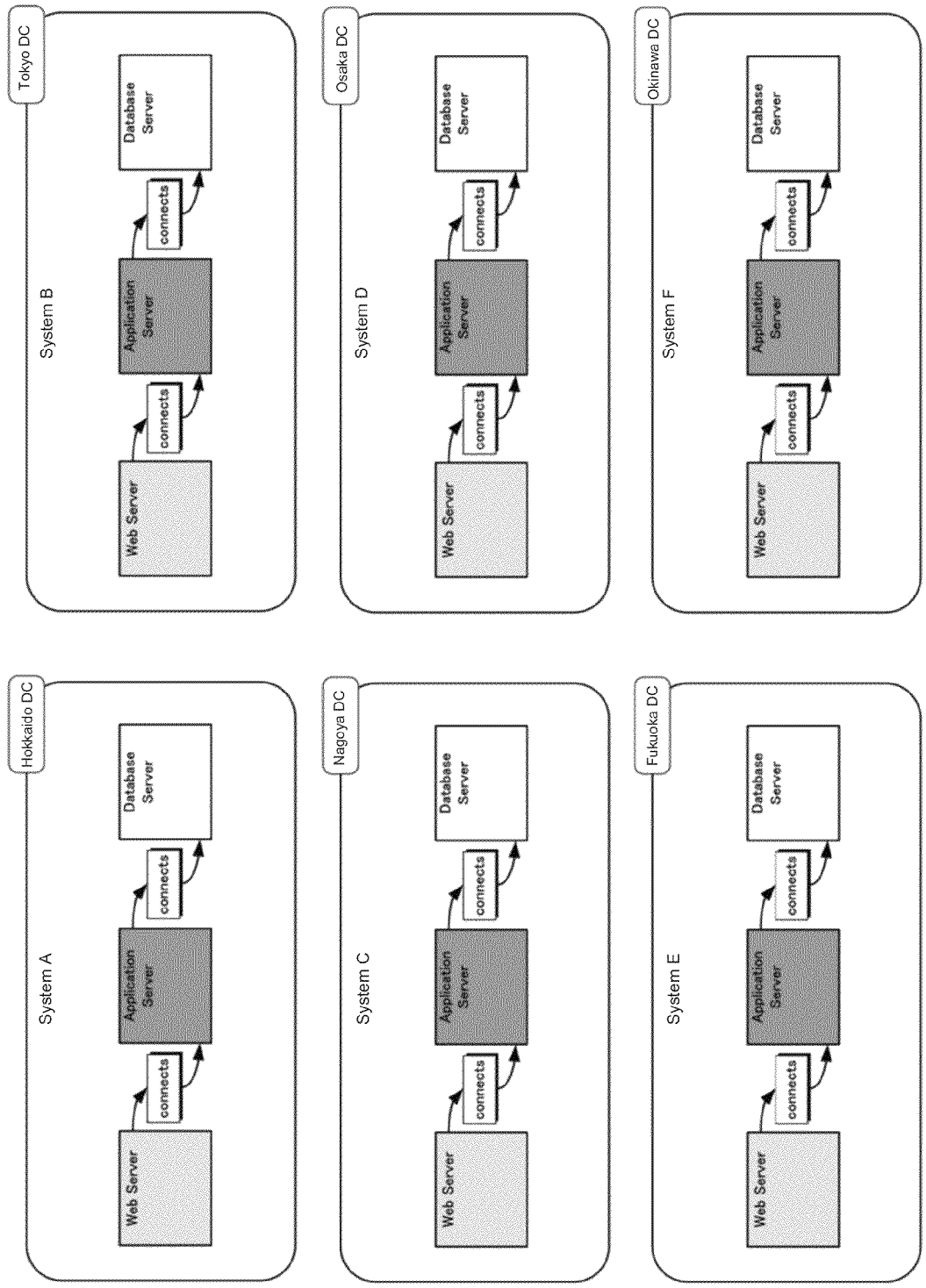
FIG. 6 is a diagram conceptually illustrating CMDB detection results.

FIG. 6 is a diagram conceptually illustrating detection results from the CMDB 200. In FIG. 6, all of the detected web service systems A-F, which has already been installed in six data centers—the Hokkaido DC, Nagoya DC, Fukuoka DC, Tokyo DC, Osaka DC, and Okinawa DC—includes software identical to Web Server System α(product names: Web Server, Application Server, Database Server), and the interactive aspects of the software are shared with the interactive aspects in Web Server System α.

Next, the CMDB 200 extracts an attribute related to a software configuration value (attribute name: value) among the attributes defining the software (CI) constituting the detected systems in accordance with the query issued by the software configuration value optimization module 104, and transfers the software (CI) constituting the systems and the configuration value for this software (attribute name: value) as search results to the software configuration value optimization module 104 (S5).

Figure 7:
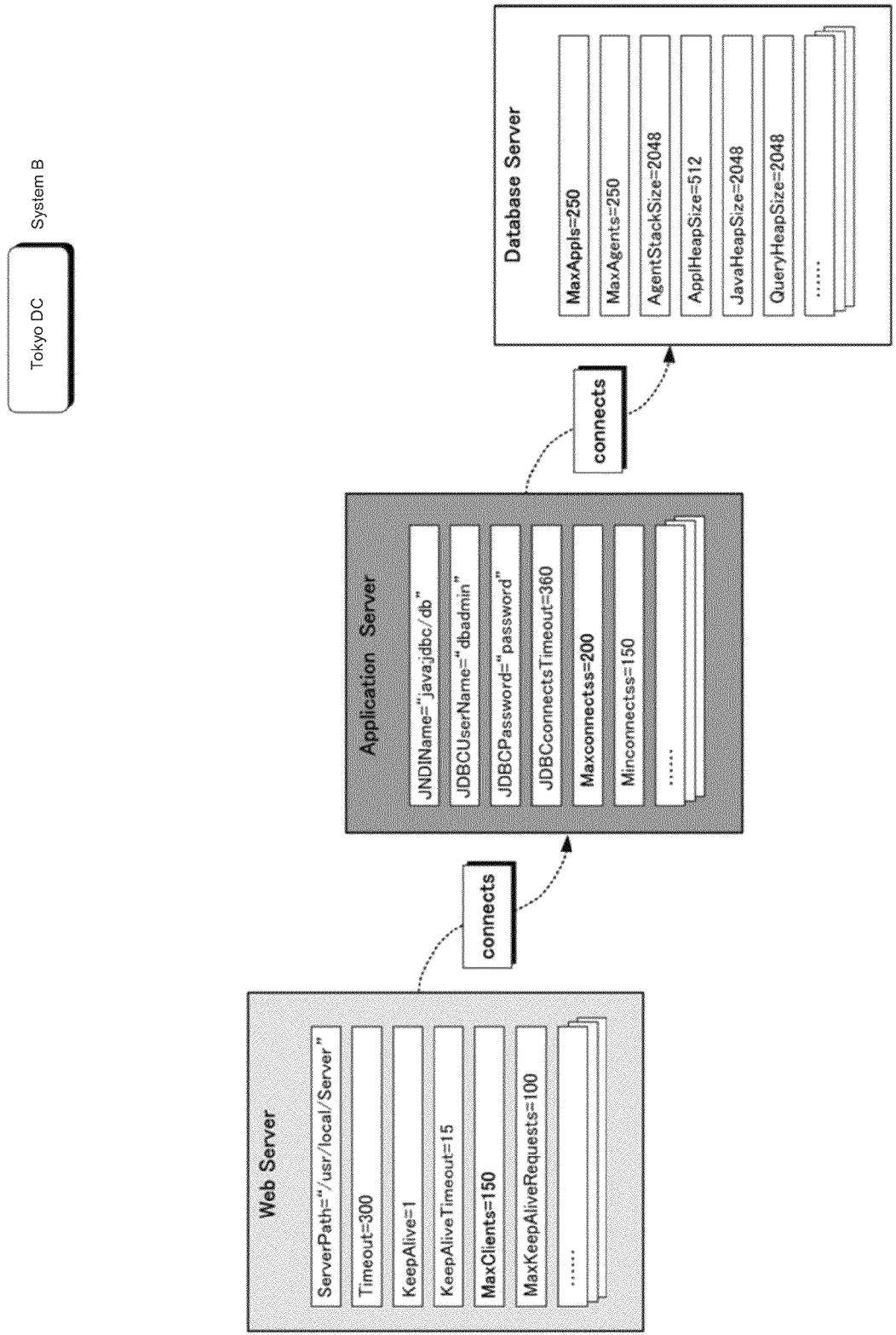
FIG. 7 is a diagram showing software configuration values for software (CI).

FIG. 7 shows an example of software configuration values for the software (CI) constituting system B previously installed in the Tokyo DC among the search results transferred to the software configuration value optimization module 104. When some of the software configuration values shown in FIG. 7 are for the Web Service System, "MaxClients" (maximum number of clients) in web server software "Web Server", "MaxConnections" (maximum number of connections) in the application server middleware "Application Server", and "MaxAppls" (maximum number of applications) in DBMS "Database Server" are interdependent parameters. The present invention addresses this point by creating a regression model for interdependent software configuration values on the basis of information collected from the CMDB 200. The following is a step-by-step explanation.

The correlation analysis requesting unit 32 in the software configuration value optimization module 104 generates a consolidated table of software configuration values based on the search results received from the CMDB 200 (S6). The correlation analysis requesting unit 32 first evaluates the operational performance of the software (CI) included in the search results, and deletes the software configuration values related to the system included in the software (CI) in which the operational performance does not satisfy a predetermined reference. Using this process, it is possible to create a regression model that reflects actual operational performance. Operational performance can be evaluated by querying other appropriate systems in the distributed network environment 500 (for example, a monitoring system and an asset management system) for software monitoring values, the number of incidents, the number of problems, operational information, and the like that are related to the software (CI) included in the search results, and then performing the evaluation based on the response.

Figure 8:
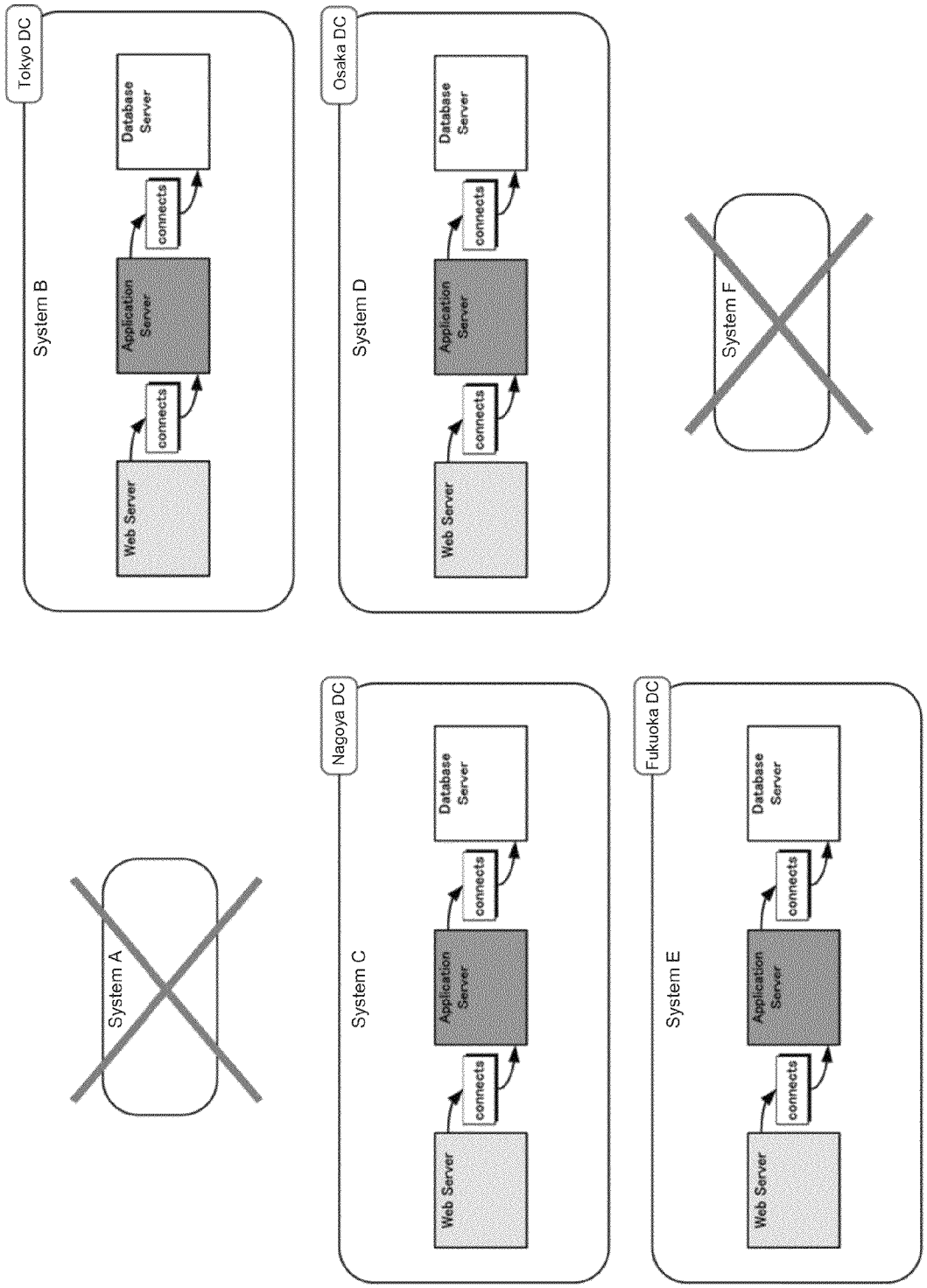
FIG. 8 is a diagram conceptually illustrating CMDB detection results after an operational performance evaluation.

FIG. 8 schematically illustrates a situation in which search results related to System A (Hokkaido DC) and System F (Okinawa DC) with insufficient operational performance are deleted from the operational performance evaluation results, and the search results from four data centers—System B (Tokyo DC), System C (Nagoya DC), System D (Osaka DC), and System E (Fukuoka DC)—are selected.

When the actual values (software monitoring values, number of incidents, number of problems, and so on) used as indicators of operational performance are held and managed as attributes of software (CI) by the CMDB 200, conditions related to actual values can be entered in queries issued to the CDMB 200 so that only information related to software (CI) with sufficient operational results is detected. In this situation, the correlation analysis requesting unit 32 also does not need to evaluate the operational performance described above.

Figure 9:
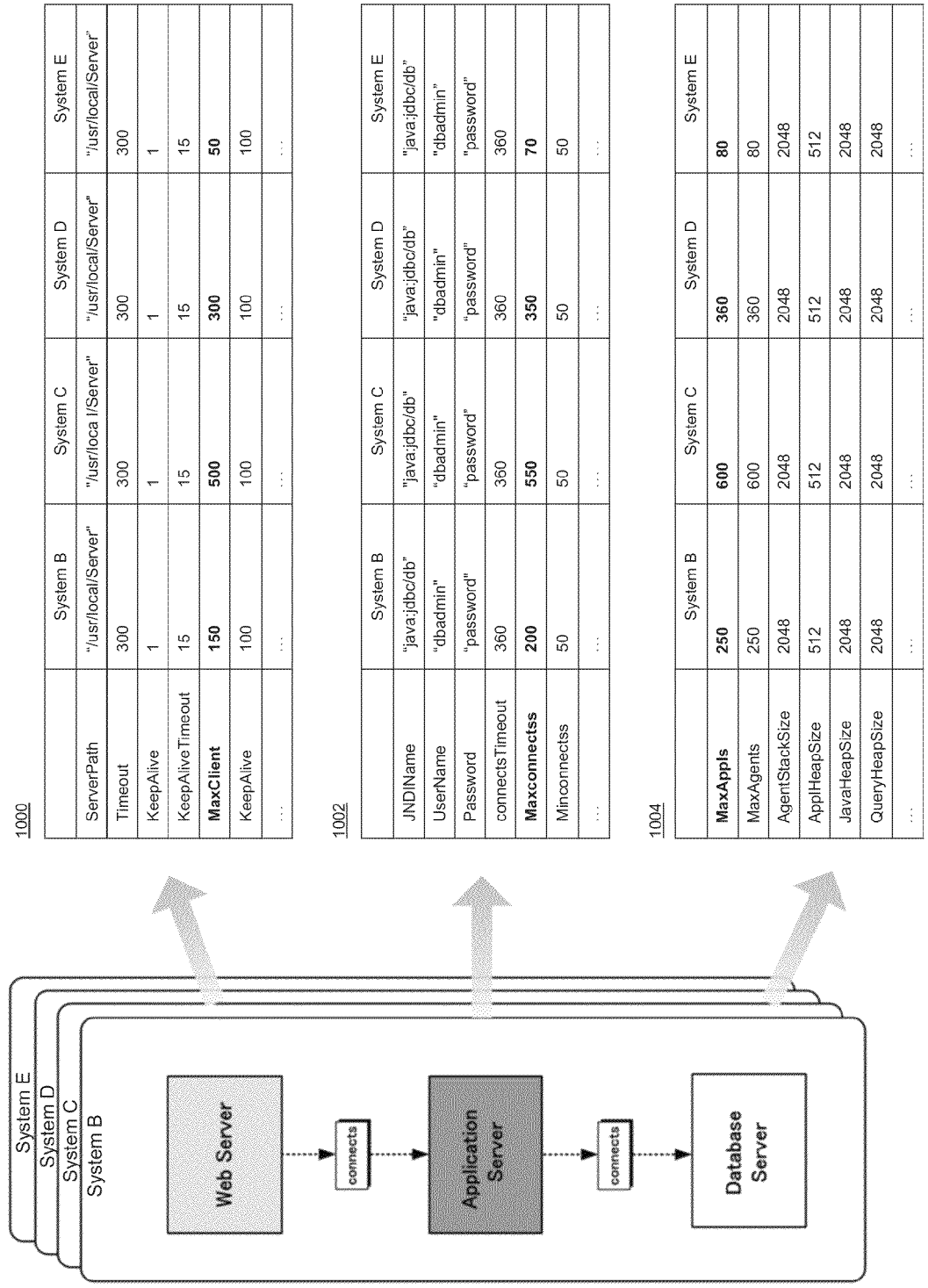
FIG. 9 is a diagram showing tables of software configuration values generated for each type of software.

Next, the correlation analysis requesting unit 32 generates a table in which the values for System B, System C, System D and System E with sufficient operational performance are linked with respect to the software configuration values of the software (CI). FIG. 9 schematically illustrates a situation in which table 1000 for "Web Server" software configuration values is generated, table 1002 for "Application Server" software configuration values is generated, and table 1004 for "Database Server" software configuration values is generated.

Next, the correlation analysis requesting unit 32 deletes rows of software correlation values (attributes) including non-numerical values from tables 1000 through 1004. In the example shown in FIG. 9, the row "ServerPath" is deleted from table 1000, and the rows "JNDINName", "UserName", and "Password" are deleted from table 1002. After deleting these rows, the correlation analysis requesting unit 32 consolidates the three tables—tables 1000 through 1004—in the column direction. As a result, the consolidated table 1006 shown in FIG. 10 is generated. The correlation analysis requesting unit 32 then transfers the consolidated table 1006 to the statistical analysis module 106, and requests a correlation analysis (S7).

Figure 11:
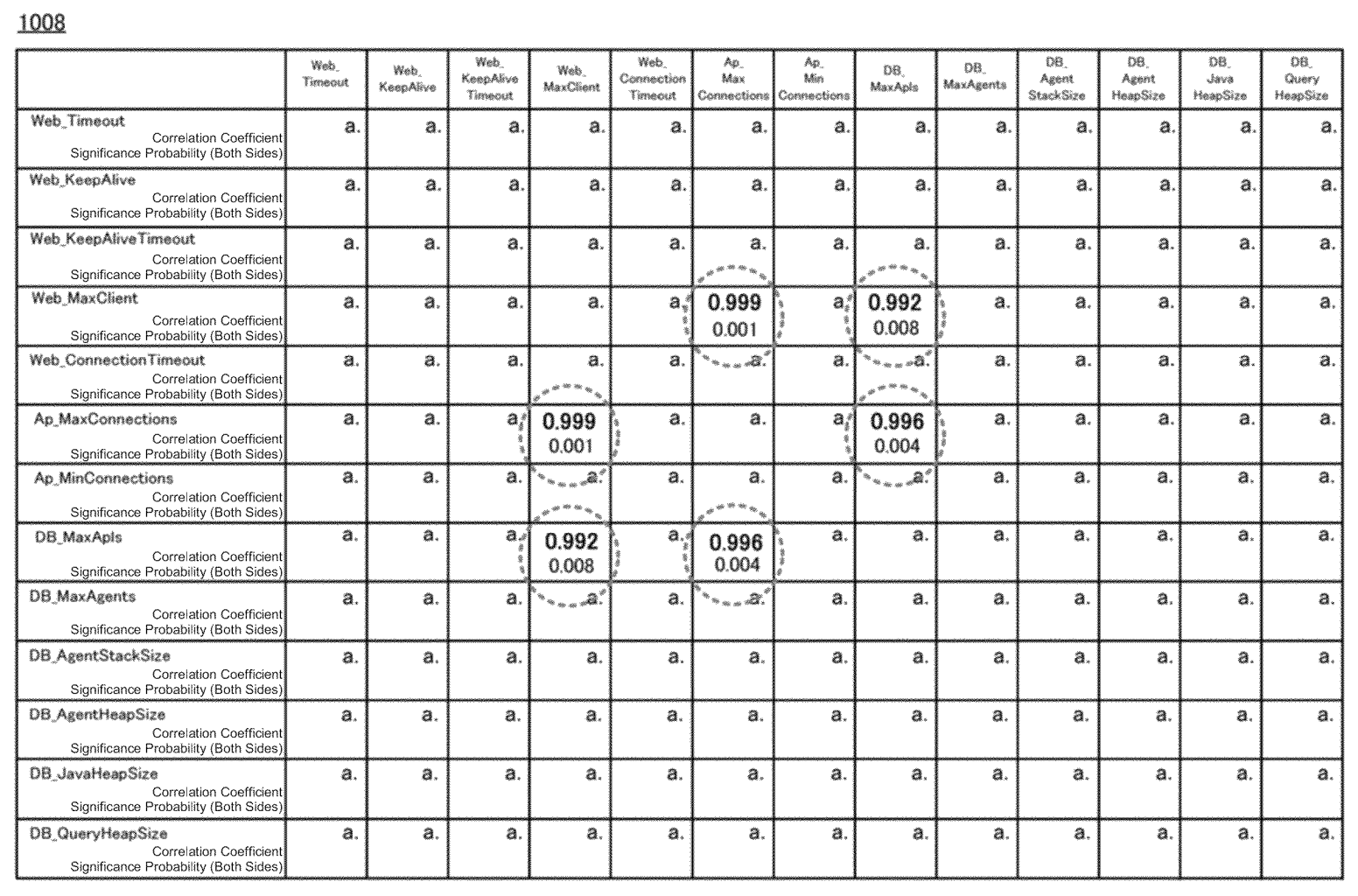

The statistical analysis module 106 executes a cross analysis based on consolidated table 1006 received from the correlation analysis requesting unit 32, and derives correlation coefficients between software configuration values stored in the consolidated table 1006 (S8). FIG. 11 shows an example of analysis results 1008 derived by the statistical analysis module 106. The statistical analysis module 106 returns the analysis results 1008 shown in FIG. 11 (correlation coefficients for pairs of software configuration values) to the regression analysis requesting unit 34 in the regression model generating unit 30 (S9).

The regression analysis requesting unit 34 uses the following steps to select pairs of software configuration values for regression analysis on the basis of the correlation coefficients between software configuration values received from the statistical analysis module 106 (S10). In the following explanation, FIG. 12 will be referenced, which schematically illustrates the processing executed by the regression model generating unit 30.

First, the regression analysis requesting unit 34 selects a pair of configuration values with a high correlation based on the received correlation coefficients between software configuration values. More specifically, a predetermined threshold value is set for the correlation coefficients between configuration values, and a pair of software configuration values whose correlation coefficient exceeds the threshold value is selected. As explained with respect to the analysis results 1008 shown in FIG. 11, when the threshold value for the correlation coefficient equals 0.990, a pair consisting of the configuration value "MaxClient" for "Web Server" and the configuration value "Max Connections" for "Application Server" (correlation coefficient =0.999), a pair consisting of the configuration value "MaxConnections" for "Application Server" and the configuration value "MaxAppls" for "Database Server" (correlation coefficient=0.996), and a pair consisting of the configuration value "MaxClient" for "Web Server" and the configuration value "MaxAppls" for "Database Server" (correlation coefficient=0.992) were selected.

Figure 12:
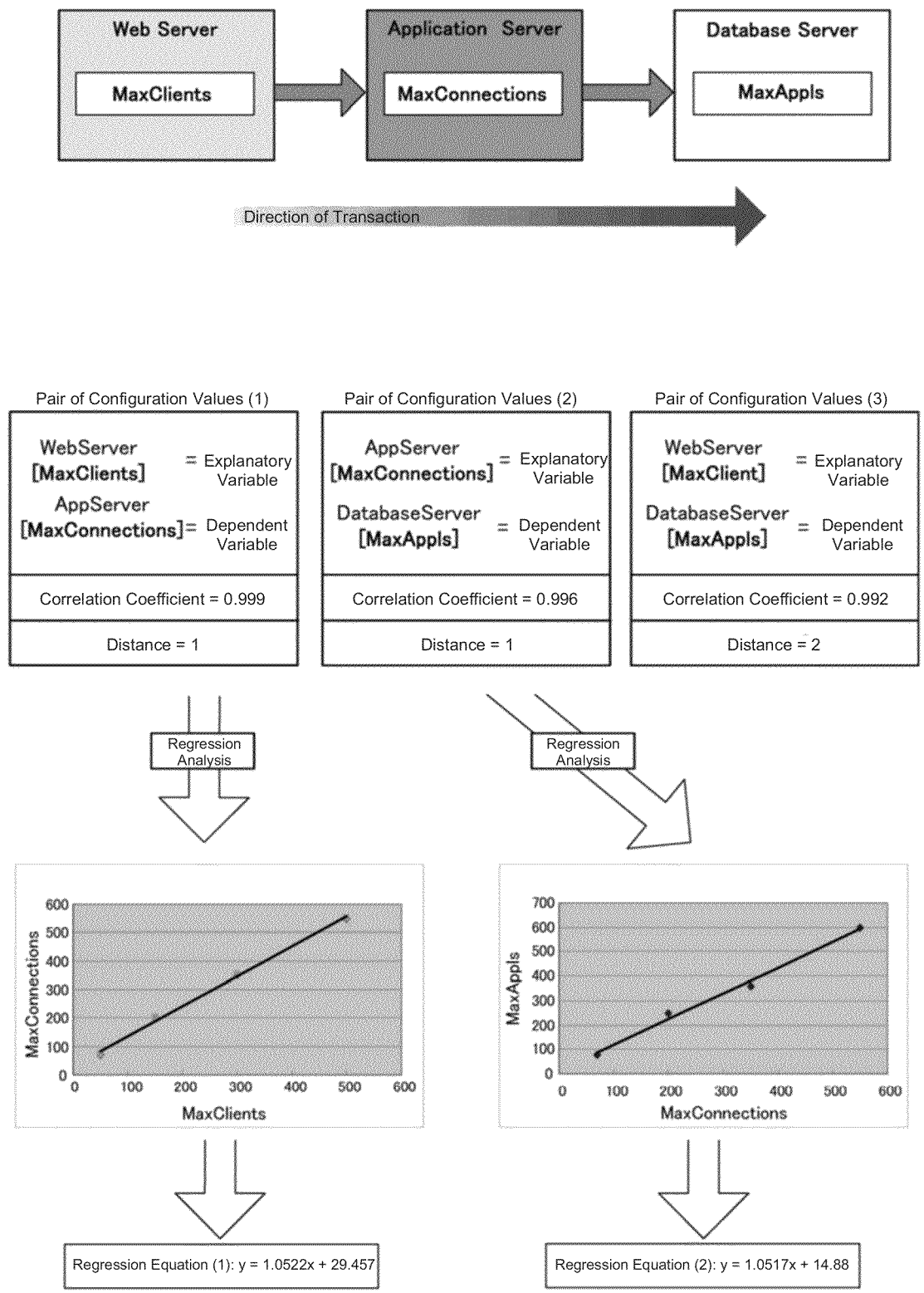
FIG. 12 is a conceptual diagram of the process executed by the regression model generating unit.

Next, the regression analysis requesting unit 34 defines one of the configuration values constituting the pair as the explanatory variable and the other as the dependent variable on the basis of the appropriate rules in order to subject the pair of selected configuration values to a regression analysis. In the present embodiment, for example, rules can be used to define the explanatory variable and the dependent variable with reference to the direction of a transaction between software programs. In FIG. 12, the configuration value for the software positioned upstream is defined as the explanatory variable and the configuration value for the software positioned downstream is defined as the dependent variable with reference to the direction of the transaction between the software programs.

Here, configuration value pair (2) and configuration value pair (3) both include configuration value "MaxAppls" for "Database Server" as the dependent variable. In this case, the regression analysis requesting unit 34 selects one or the other as a pair to be subjected to regression analysis in accordance with the appropriate rules in order to prevent two simple regression models with the same dependent variable "MaxAppls" from being generated. FIG. 12 shows an example in which pairs are selected for regression analysis on the basis of two rules which are applied in numerical order: (Applicable Rule 1) select the pair whose distance between software programs (CI) is smaller, and (Applicable Rule 2) select the pair whose correlation coefficient between software configuration values is greater. In the example shown in FIG. 12, the distance between "Application Server" and "Database Server" in configuration value pair (2) equals 1, and the distance between "Web Server" and "Database Server" in configuration value pair (3) equals 2, so configuration value pair (2) is selected as the pair to be subjected to regression analysis. Here, the size of the correlation coefficients for each pair is compared when the distance of each pair is the same. Because the correlation coefficient of configuration value pair (2) equals 0.996 and the correlation coefficient of configuration value pair (3) equals 0.992, configuration value pair (2) is selected here too as the pair to be subjected to regression analysis. In the example shown in FIG. 12, the regression analysis requesting unit 34 eventually determines both configuration value pair (1) and configuration value pair (2) are pairs to be subjected to regression analysis, and a request is sent to the statistical analysis module 106 to perform a regression analysis of configuration value pair (1) and configuration value pair (2) (S11).

The statistical analysis module 106 executes a regression analysis on configuration value pair (1) (explanatory variable: MaxClient, dependent variable: MaxConnections) and on configuration value pair (2) (explanatory variable: MaxConnections, dependent variable: MaxAppls), and returns regression equation (1) and regression equation (2) shown in FIG. 11 to the regression model generating unit 30 as regression models (S13).

When the regression model generating unit 30 sets regression equation (1) and regression equation (2) received from the statistical analysis module 106 in the regression model storage unit 50 (S14), the GUI unit 12 in the software introduction configuration module 102 is notified (S15). The GUI unit 12 receives the notification, and displays it on the software configuration value optimization screen (GUI) (S16).

Figure 13:
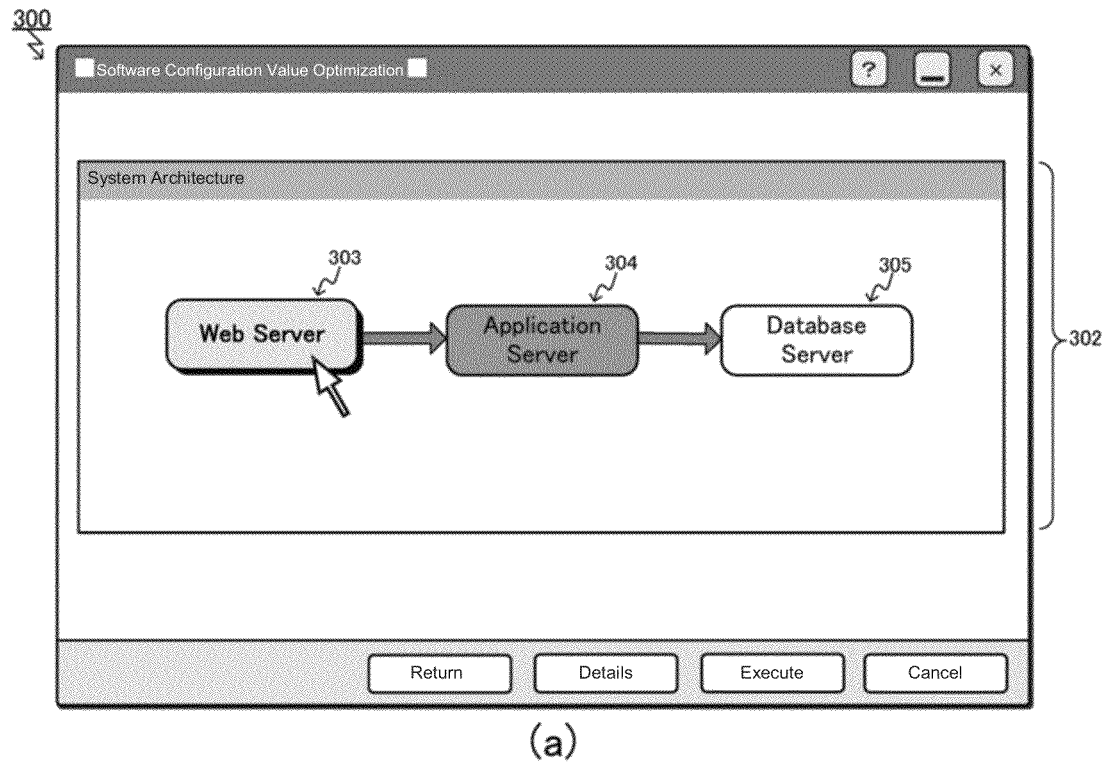
FIG. 13 is a diagram showing a software configuration value optimization screen in the embodiment.
Figure 13:
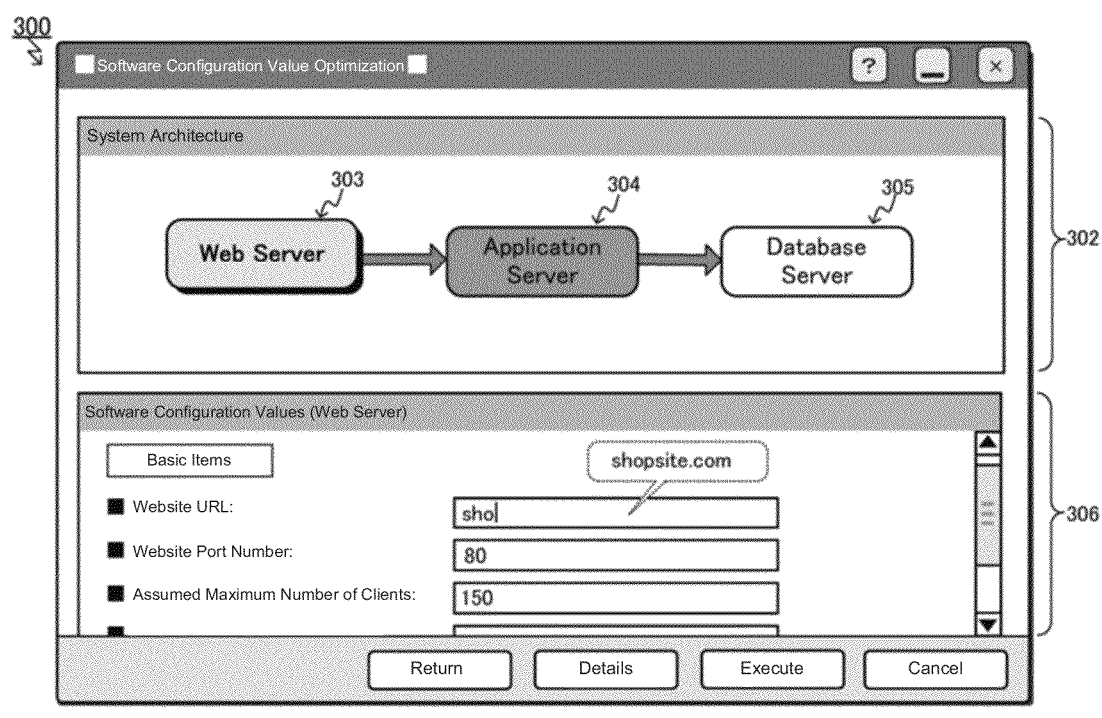

FIG. 13 (*a*) shows a software configuration value optimization screen 300 provided to the user. GUI (icon 303 indicating "Web Server", icon 304 indicating "Application Server", and icon 305 indicating "Database Server" are displayed in field 302 of the software configuration value optimization screen 300 to specify the attributes of the software (product names) in the system architecture information inputted by the user in S1 of FIG. 4. In the present embodiment, the software can be specified by clicking on any one of the icons 303-305.

As shown in FIG. 13 (a), when the user clicks on icon 303 to specify "Web Server", a new field 306 appears below field 302 as shown in FIG. 12 (b) to set a software configuration value for "Web Server". An input field is displayed in field 306 for inputting a software configuration value for "Web Server". In field 306, the field for inputting the item among the software configuration values that has to be set by the user (referred to below as a basic item, such as "Website URL") is blank. Meanwhile, the rest contain initial values for the other software configuration values. In the example shown in FIG. 13 (b), the initial value "150" is displayed in the input field for the software configuration value "assumed maximum number of clients". When the user has inputted the required information in the blank input field, and has finished setting the basic items for "Web Server", icon 304 is clicked to set the basic items for "Application Server". Finally, icon 305 is clicked to set the basic items for "Database Server", and complete the setting of basic items for all of the software programs.

Figure 14:
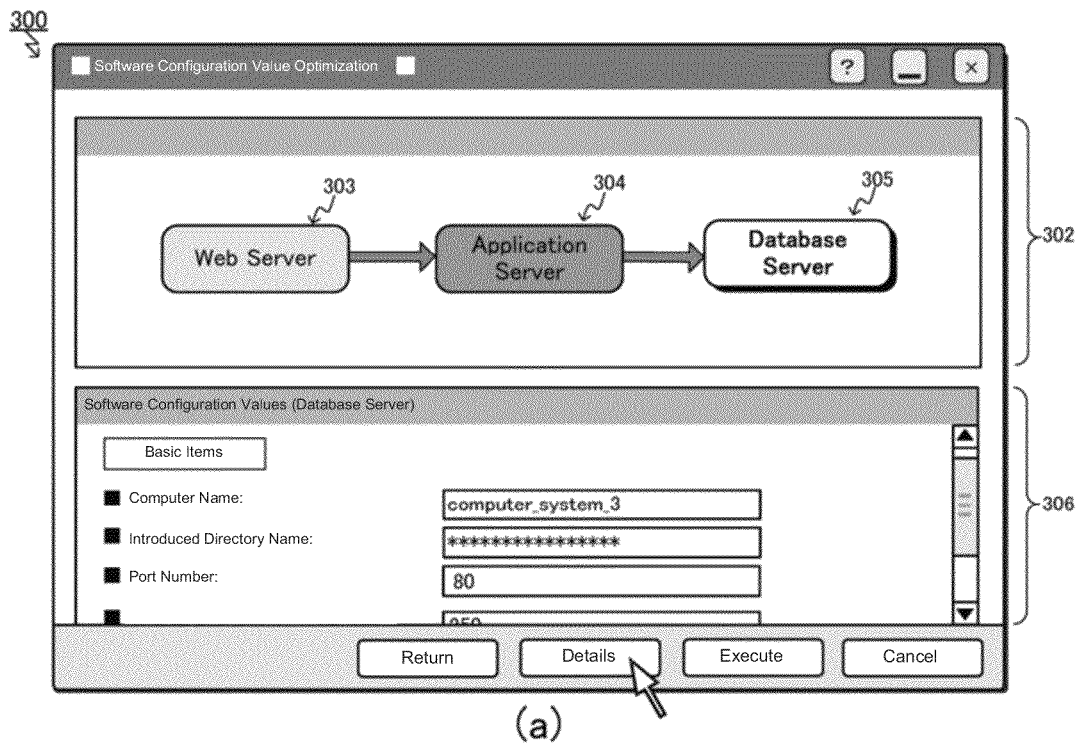
FIG. 14 is a diagram showing a software configuration value optimization screen in the embodiment.

FIG. 14 (a) shows the situation when the series of basic items mentioned above have been set. When the user clicks on the "Details" button at this time, the software configuration value list dialog box 400 shown in FIG. 14 (b) appears which shows lists of software configuration values for "Web Server", "Application Server" and "Database Server". The software configuration values displayed at this time exclude the basic items inputted by the user, and are the initial values set by the manufacturers of the software.

Figure 15:
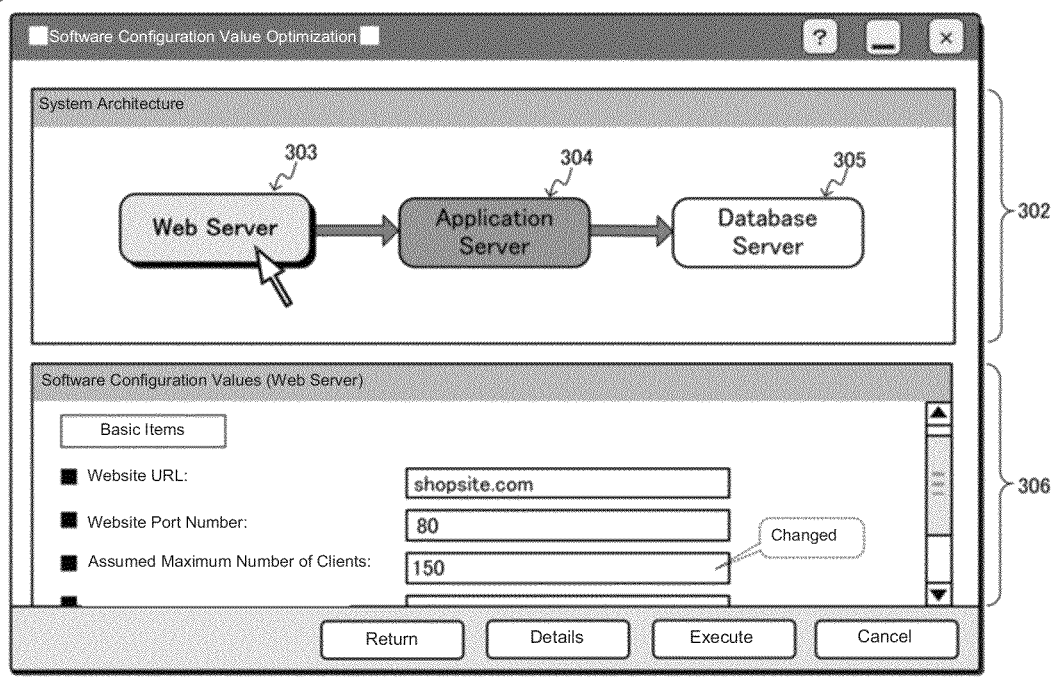
FIG. 15 is a diagram showing a software configuration value optimization screen in the embodiment.
Figure 15:
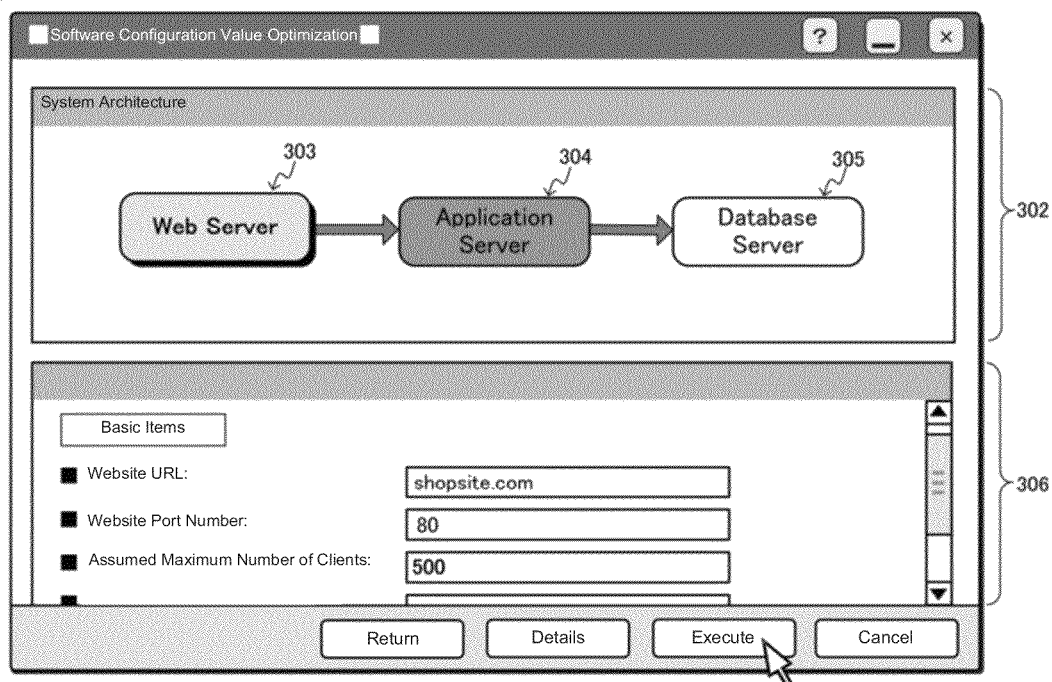

Next, for example, the user clicks icon 303 on the software configuration value optimization screen 300 to specify "Web Server" as shown in FIG. 15 (a), and then clicks the "Execute" button to change the setting in the input field for the assumed maximum number of clients from "150" to "500" as shown in FIG. 15 (b) (S17). In response, the GUI unit 12 in the software introduction and configuration module 102 notifies the optimum value calculating unit 40 in the software configuration value optimization module 104 of the inputted condition "MaxClient=500".

In response to the notification, the optimum value calculating unit 40 retrieves the regression model (regression equation (1) and regression equation (2)) stored in the regression model storage unit 50, applies the input condition "MaxClient=500" in the notification, and acquired the optimum value. More specifically, "MaxClient=500" is plugged into regression equation (1), and acquires value "555" for the configuration value "MaxConnections" in "Application Server" as a result. It then plugs the acquired optimum value "MaxConnections =555" into regression equation (2), and acquires value "599" for the configuration value "MaxAppls" in "Database Server" as a result (S18). The optimization value calculating unit 40 returns the acquired optimum values "MaxConnections=555" and "MaxAppls=599" to the GUI unit 12 and the configuration value setting unit 14 in the software introduction and configuration module 102 (S19).

In response to receiving the optimum values from the optimum value calculating unit 40, the configuration value setting unit 14 in the software introduction and configuration module 102 remotely changes the software configuration value "MaxConnections" in "Application Server" installed in computer device 130 on the network 502 from the initial value "200" to the optimum value "555". Also, the configuration value setting unit 14 remotely changes the software configuration value "MaxAppls" in "Database Server" installed in computer device 140 on the network 502 from the initial value "250" to the optimum value "599" (S20). Afterwards, the GUI unit 12 displays the execution results dialog box 308 shown in FIG. 16 (a) on the software configuration value optimization screen 300 to notify the user that the software configuration values have been optimized.

Figure 16:
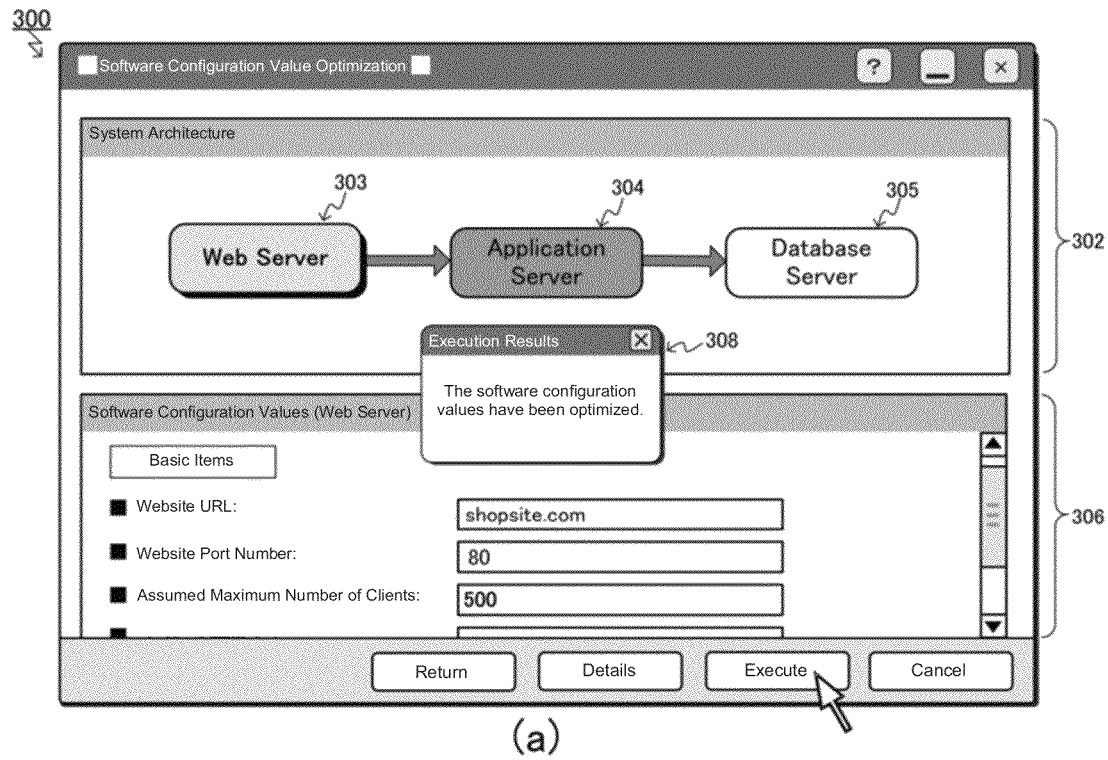
FIG. 16 is a diagram showing a software configuration value optimization screen in the embodiment.
Figure 16:
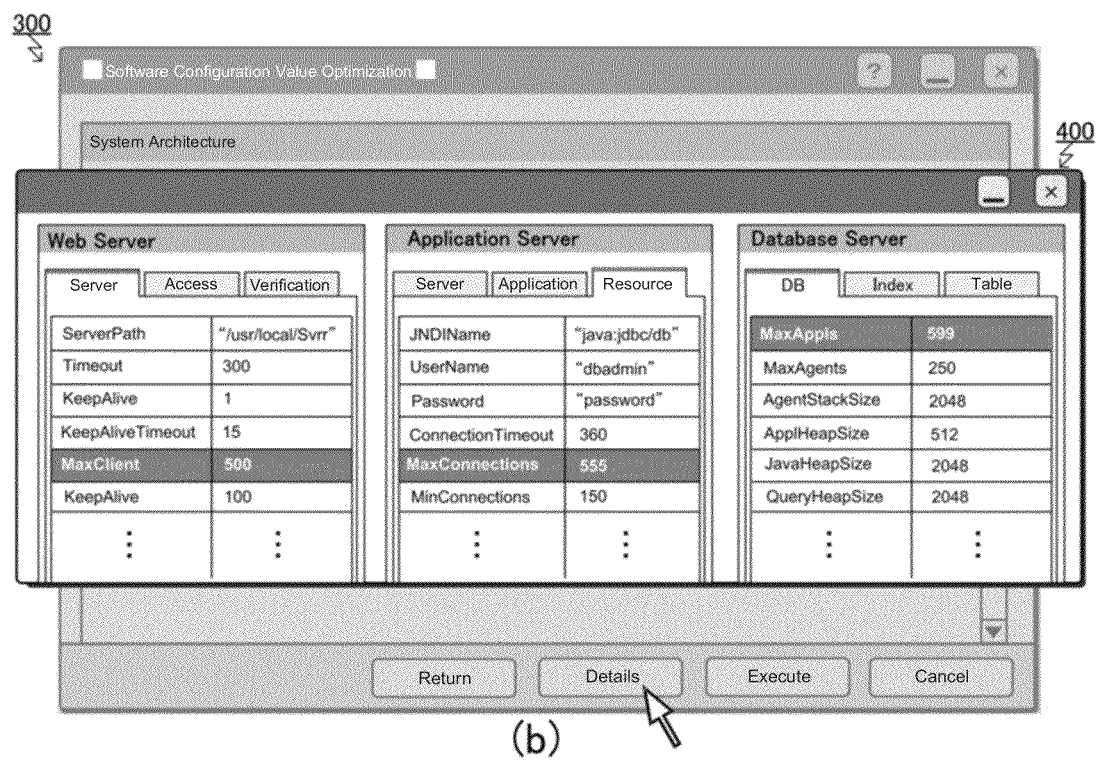

FIG. 16 (b) shows the situation when the automatic optimization of the software configuration values has been completed, the user has clicked the "Details" button on the software configuration value optimization screen 300, and the software configuration value list dialog box 400 has been displayed. In the example shown in FIG. 16 (b), the optimized software configuration values are highlighted in the software configuration value list dialog box 400 so that the user can verify that, in response to setting the assumed maximum number of clients in "Web Server" to "500", the configuration value "MaxConnections" in "Application Server" has been optimized to "555", and the configuration value "MaxAppls" in "Database Server" has been optimized to "599".

In the integrated system introduction support device 100 of the embodiment of the present invention explained above, the software introduction/ configuration module 102, the software configuration value optimization module 104, and the statistical analysis module 106 were installed in the same computer device. However, the present invention is not limited in any way by the embodiment described above. In the present invention, function modules 102, 104, and 106 described above can be distributed as appropriate units in the network.

Figure 17:
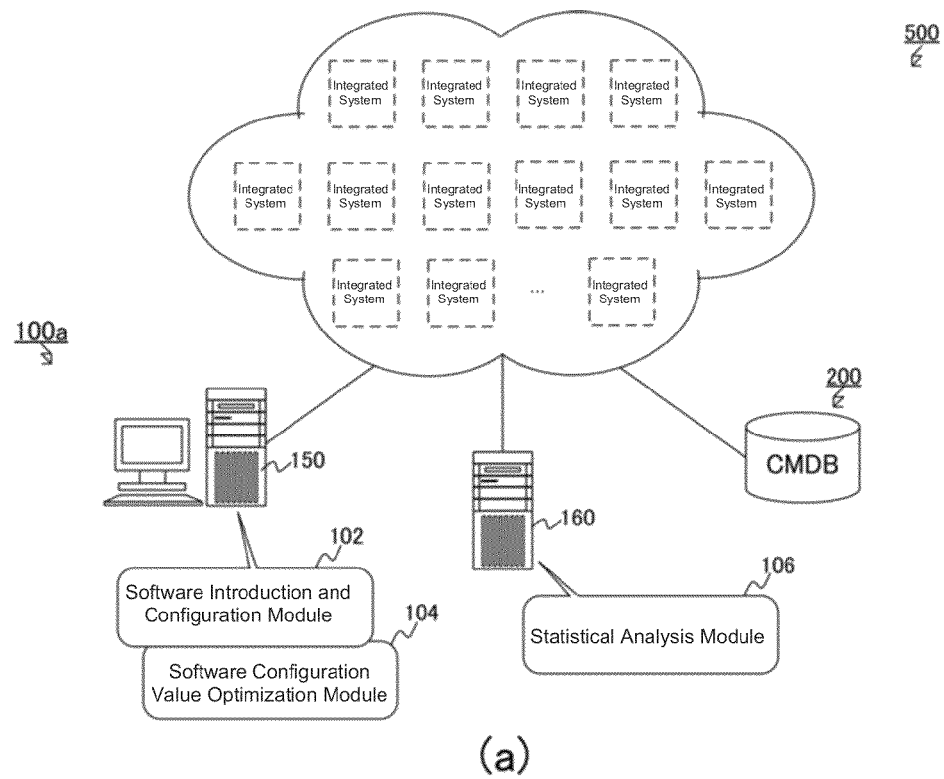
FIG. 17 is a conceptual diagram showing the integrated system introduction support system in the embodiment installed in a distributed network environment.
Figure 17:
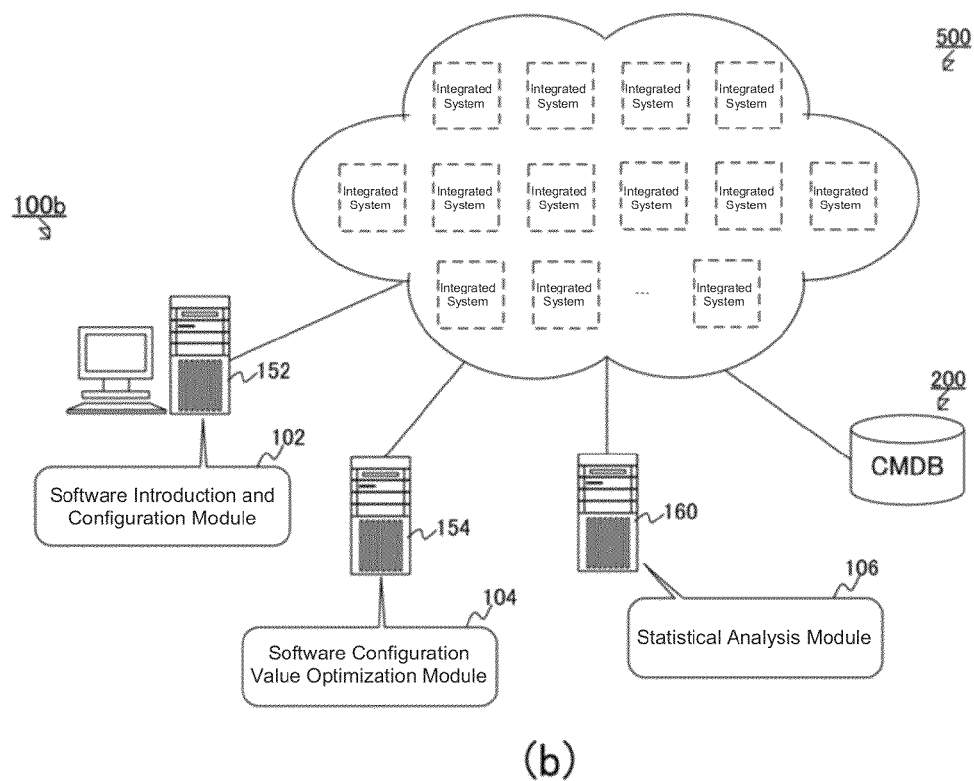

FIG. 17 (a) shows an embodiment in which the software introduction and configuration model 102 and the software configuration value optimization module 104 are installed in computer device 150, the statistical analysis module 106 is installed in computer device 160, and these computer devices interact over the network. In this situation, computer device 150 constitutes the integrated system introduction and support device. Meanwhile, FIG. 17 (b) shows an embodiment in which the software introduction and configuration model 102 is installed in computer device 152, the software configuration value optimization module 104 is installed in computer device 154, the statistical analysis module 106 is installed in computer device 160, and these computer devices interact over the network. In this situation, two computer devices, computer device 152 and computer device 154, interacting over the network constitute the integrated system introduction and support device.

In the embodiment described above, the regression model generating unit 30 generates a simple regression model for software configuration values. In the present invention, a multiple regression model in which two or more explanatory variables (configuration values) are defined for every dependent variable (configuration value) can be generated, or a non-linear regression model can be generated. Also, the scope of the present invention includes any embodiment carried out by a person of skill in the art which has the operations and effects of the present invention.

The functions in the embodiment described above can be realized by an executable program written in any object-oriented programming language such as C, C++, C#, or Java®, and a program in the present embodiment can be stored and distributed on a readable recording medium such as a hard disk device, CD-ROM, MO, DVD, floppy disk, EEPROM or EPROM, or can be propagated over the network in a readable format.

REFERENCE SIGNS LIST

12: GUI Unit
14: Configuration Value Setting Unit

20: CMDB Search Unit
30: Regression Model Generating Unit
32: Correlation Analysis Requesting Unit
34: Regression Analysis Requesting Unit
40: Optimum Value Calculating Unit
50: Regression Model Storage Unit
100: Integrated System Introduction Support Device
102: Software Introduction and Configuration Module
104: Software Configuration Value Optimization Module
106: Statistical Analysis Module
120, 130, 140: Computer Devices
150, 152, 154, 160: Computer Devices
200: CMDB
300: Software Configuration Value Optimization Screen
302, 306: Field
303-305: Icon
308: Execution Result Dialog Box
400: Software Configuration Value List Dialog Box
500: Distributed Network Environment
502: Network
1000-1004: Tables
1006: Consolidated Table
1008: Analysis Result

What is claimed is:

1. A method for optimizing configuration values in a plurality of software programs in an integrated system, the software programs in the integrated system interacting with each other via a network, the method comprising the steps of:
collecting, from a configuration management database (CMDB) in the network, the configuration values in the plurality of software programs constituting the integrated system and other configuration values of software programs constituting any other integrated system sharing interactive aspects therewith;
generating a regression model of configuration values having a high correlation among the collected configuration values; and
calculating an optimum value for the collected configuration values using the regression model.

2. The method of claim 1, wherein the step for calculating the optimum value for the configuration values of the plurality of software programs constituting the integrated system applies, in response to specification of a configuration value in a predetermined software program among the plurality of software programs constituting the integrated system, the configuration value to the regression model and calculates an optimum value for the other software programs constituting the integrated system.

3. The method of claim 1, wherein the step for generating the regression model comprises the steps of:
requesting a correlation analysis of the collected configuration values from a statistical analysis module;
requesting a regression analysis of configuration values having a high correlation from the statistical analysis module on the basis of the results of the correlation analysis; and
generating a regression model on the basis of the results of the regression analysis.

4. The method of claim 3, wherein the step for requesting a regression analysis from the statistical analysis module comprises the step of: defining one of the configuration values having a high correlation as a dependent variable, and the rest as explanatory variables on the basis of the direction of the transaction between software programs.

5. The method of claim 1, wherein the step for generating a regression model comprises the step of: evaluating the operational performance of the software, and generating a regression model for the configuration values of the software having operational performance exceeding a predetermined reference.

6. The method of claim 1, wherein the step for collecting configuration values comprises the step of: collecting configuration values from software having operational performance exceeding a predetermined reference on the basis of an attribute, the attribute being an indicator of operational performance managed by the CMDB.

7. The method of claim 1 further comprising a step of:
setting the calculated optimum value in another software program installed in a computer device in the network.

8. A device for optimizing configuration values in a plurality of software programs in an integrated system, the software programs in the integrated system interacting with each other via a network, the device comprising a data processor coupled to a memory having instructions stored therein that are configured to perform, when executed by the data processor, steps of:
collecting, from a configuration management database (CMDB) in the network, the configuration values in the plurality of software programs constituting the integrated system and other configuration values of software programs constituting any other integrated system sharing interactive aspects therewith;
generating a regression model of configuration values having a high correlation among the collected configuration values; and
calculating an optimum value for the collected configuration values using the regression model.

9. The device of claim 8, wherein the step for calculating the optimum value for the collected configuration values applies, in response to specification of a configuration value in a predetermined software program among the plurality of software programs constituting the integrated system, the configuration value to the regression model and calculates an optimum value for the other software programs constituting the integrated system.

10. The device of claim 8, wherein the step for generating the regression model comprises requesting a correlation analysis of the collected configuration values from a statistical analysis module, and requesting a regression analysis of configuration values having a high correlation from the statistical analysis module on the basis of the results of the correlation analysis, and wherein a regression model is generated on the basis of the results of the regression analysis.

11. The device of claim 10, wherein the step for requesting the regression analysis from the statistical analysis module comprises defining one of the configuration values having a high correlation as a dependent variable, and the rest as explanatory variables on the basis of the direction of the transaction between software programs.

12. The device of claim 8, wherein the step for generating the regression model comprises evaluating the operational performance of the software, and generating a regression model for the configuration values of the software having operational performance exceeding a predetermined reference.

13. The device of claim 8, wherein the step for collecting the configuration values comprises collecting configuration values from software having operational performance exceeding a predetermined reference on the basis of an attribute, the attribute being an indicator of operational performance managed by the CMDB.

14. The device of claim 8 further comprising:
setting the calculated optimum value in another software program installed in a computer device in the network.

15. A system for optimizing configuration values in a plurality of software programs in an integrated system, the software programs in the integrated system interacting with each other via a network, the system comprising a data processor and a memory comprising program code executable by the data processor to perform steps of:
- collecting, from a configuration management database (CMDB) in the network, the configuration values in the plurality of software programs constituting the integrated system and other configuration values of software programs constituting any other integrated system sharing interactive aspects therewith;
- generating a regression model of configuration values having a high correlation among the collected configuration values;
- applying the collected configuration values to the regression model in response to specification of a configuration value in a predetermined software program among the plurality of software programs constituting the integrated system, and calculating an optimum value for other software programs constituting the integrated system; and
- setting the calculated optimum value in another software program installed in a computer device in the network.

16. A computer-readable program stored in a storage device and configured to optimize configuration values in a plurality of software programs in an integrated system, the software programs in the integrated system interacting with each other via a network, by performing, when executed by a data processor, steps of:
- collecting, from a configuration management database (CMDB) in the network, the configuration values in the plurality of software programs constituting the integrated system and other configuration values of software programs constituting any other integrated system sharing interactive aspects therewith;
- generating a regression model of configuration values having a high correlation among the collected configuration values; and
- calculating an optimum value for the collected configuration values using the regression model.

* * * * *